April 27, 1948.　　　R. B. COTTON　　　2,440,574
AIRCRAFT BARRIER
Filed May 29, 1947　　　3 Sheets-Sheet 1

INVENTOR.
ROBERT B. COTTON.
BY
Herbert M Birch
HIS ATTORNEY.

April 27, 1948.   R. B. COTTON   2,440,574
AIRCRAFT BARRIER
Filed May 29, 1947   3 Sheets-Sheet 2

INVENTOR.
ROBERT B. COTTON.
BY
Herbert M. Birch
HIS ATTORNEY.

April 27, 1948.  R. B. COTTON  2,440,574
AIRCRAFT BARRIER
Filed May 29, 1947  3 Sheets-Sheet 3

INVENTOR.
Robert B. Cotton.
BY
Herbert M. Birch
HIS ATTORNEY.

Patented Apr. 27, 1948

2,440,574

UNITED STATES PATENT OFFICE 2,440,574

AIRCRAFT BARRIER

Robert B. Cotton, Lansdowne, Pa., assignor to All American Aviation, Inc., Wilmington, Del., a corporation of Delaware Application May 29, 1947, Serial No. 751,485

6 Claims. (Cl. 244—110)

The present invention relates generally to aircraft barriers and more particularly to an aircraft barrier formed to arrest aircraft having different types and sizes of landing gear.

Heretofore, barriers for arresting and decelerating landing aircraft have usually comprised nothing more than a single strand of cable or a normally vertically upright net adapted to swing down after impact with the landing gear of an aircraft. With these prior art barriers, there is no provision made for handling different types of landing gear, such as tricycle and standard two-wheel gears, or for handling different sizes of tricycle gears. Accordingly, the principal object of the present invention is to provide and aircraft barrier for landing aircraft for any type of landing gear safely on surfaces of restricted area.

Another object of the invention is to provide a novel arrangement of connected cables or strands to form a barrier whereby aircraft with tricycle landing gear of different spreads from the nose-wheels to the rear wheels may be safely decelerated and brought to a stop on short runways or the like.

A further object is to provide for novelly mounting the barrier stanchions for most efficient operation during use and for retraction for the barrier when not in use.

Still a further object is to provide clamp means for connecting a plurality of longitudinally positioned cables or strands and crossties of stringer cables together, which clamps are adapted to strengthen the barrier and serve to materially resist the strains set up by the impact of an aircraft at the cross connection between the cables and crossties. Other objects and advantages of the invention will appear upon reference to the following detailed description when read in connection with the accompanying drawings, wherein.

Figure 1:
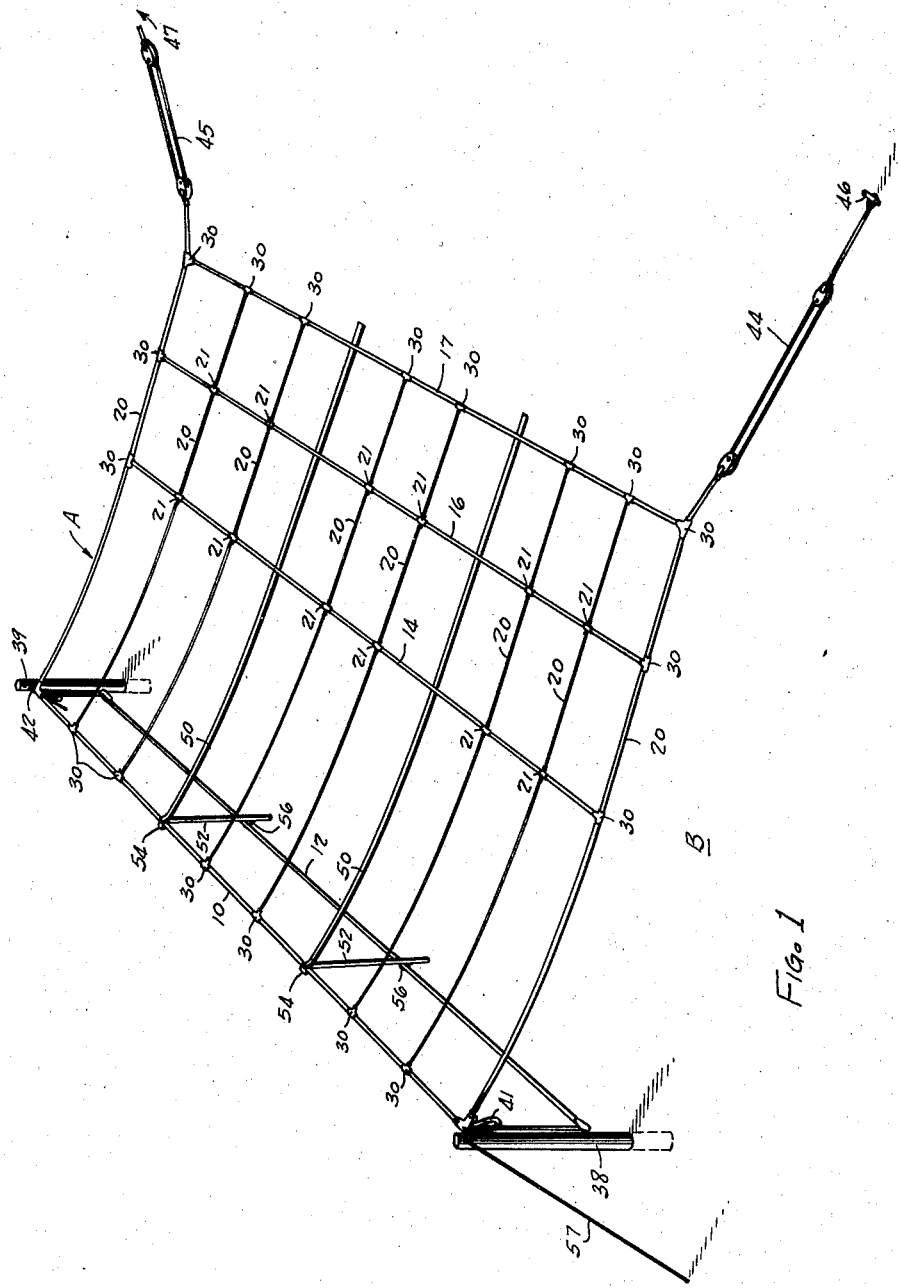
Figure 1 is a perspective view of one embodiment of the invention set up for operation as it appears from the air.
Figure 2:
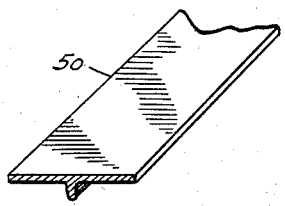
Figure 2 is a cross-section view of a fragmentary portion of one of the ramp bars used to the embodiment in Fig. 1.
Figure 3:
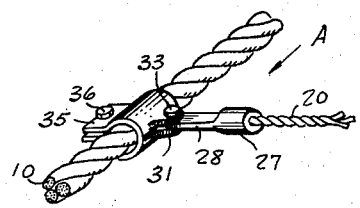
Figure 3 is a detailed view in perspective of a cross strand terminal connection and cable clamp for coupling or connecting a cross strand end with a medial portion of one of the longitudinal cables.
Figure 4:
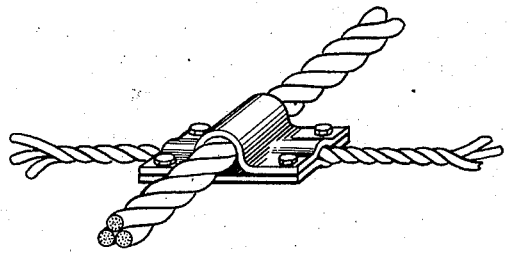
Figure 4 is a detail view of a form of clamp used for connecting the crossed points of the longitudinally positioned cables and the crossties or stringer cables.

Referring in detail to the drawings and first with reference to Fig. 1, there is illustrated an embodiment of the barrier comprising a net-like body A formed from a plurality of horizontally positioned cables 10, 12, 14, 16, and 17. Each of these cables are connected together by cross stringers or strands 20 of any desired number. The cables and stringers are secured together at their respective cross points by any suitable means, such as clamps 21, see Fig. 4, formed from a bottom plate 23 and a top U-plate 24 fastened together by bolts 25; while the ends of each stringer 20 are secured within terminal lugs 27 formed with a flat apertured tip portion 28. This portion 28 is adapted to couple to a split sleeve 30 formed with spaced apertured ears 31 projecting from the closed side of the split sleeve. These ears 31 receive the flat apertured tip portion 28 and the parts are secured together by a bolt 33 through the aligned apertures of the ears 31 and the tip portion 28 of the terminal lug 27. On the split side of the sleeve 30 are apertured flanges 35, which upon insertion of the bolt or rivet 36 are pulled together to clamp the sleeve around the cable 10.

Figure 6:
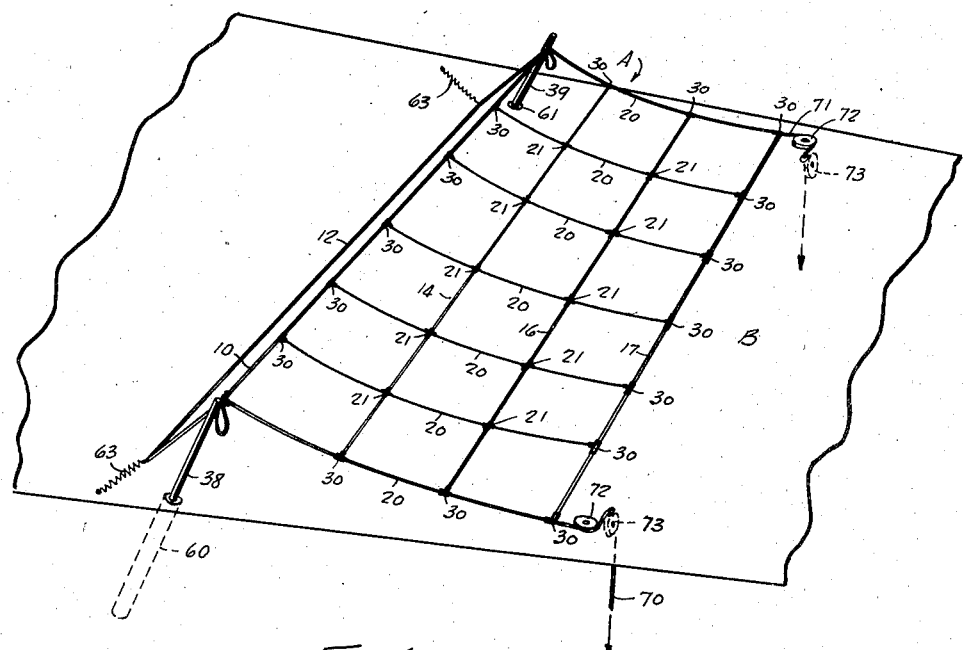
Figure 6 is a top perspective view of another embodiment of the invention showing a retractable barrier mounting arrangement.
Figure 7:
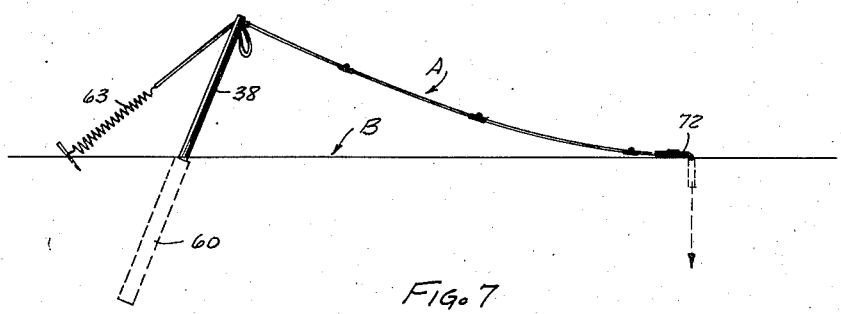
Figure 7 is a side elevation view of the same in raised operative position.
Figure 8:
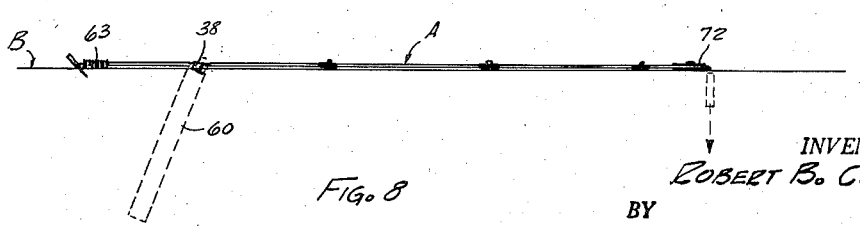
Figure 8 is a side elevation view of the same in retracted inoperative position flat upon the landing surface.

The cable 10 may be said to be the end or marginal cable of the barrier A and it is mounted between support means, such as stanchions 38 and 39. Preferably these stanchions are retractably mounted in a landing surface B, as generally shown in Figures 6, 7 and 8. Each end of cable 10 is connected to the top of each stanchion 38 and 39 by frangible couplings or shear links 41 and 42, respectively. These shear links may be of a particular type such as undrawn nylon shear links, which will stretch about six-hundred times their normal undrawn length before shearing off, to thereby aid materially in absorbing the shock developed by the impact of the wheels of an airplane landing gear.

The cable 12 previously referred to is also similarly stretched and connected between the stanchions 38 and 39. Cable 12 is mounted below the cable 10 out of connection with the cross stringers 20, and so arranged with respect to the cable 10 as to cooperate to arrest a standard two wheel airplane landing gear, as will be explained more fully hereinafter under the heading "Operation."

The present barrier A is arranged to arrest tricycle landing gear of different sizes by the spacing of the cables 10, 14, 16 and 17. For example, cables 10 and 14 provide for one size, 10 and 16 for a second larger size, and 10 and 17 for a third still larger size, the cable 10 always engaging with the nose wheel of the tricycle gear and the cables 14, 16 or 17 with the rear wheels thereof depending upon the size of landing gear and position relation thereto of the landing gear rear wheels.

An important feature of the present invention is the mounting of the barrier at an incline slanting toward the airplane approach side thereof. To accomplish this, the cable 10 is elevated so as to be at the highest horizontal level above the landing surface B, while the approach-side cable 17 is at the lowest horizontal level above the landing surface. Thus, the intermediate cables 14 and 16 are in progressively higher horizontal planes or levels above the cable 17 in step-like formation. The upper marginal cable 10 and the lower approach-side cable 17 are held taut between their respective end connections. The connections of the cable 10 have been described as undrawn nylon shear links 41 and 42 securing each end thereof to the stanchions. The cable 17 however, is permanently coupled to each end to energy absorbing means 44 and 45, which may be undrawn polyethylene, Vinyon, or nylon or other synthetic plastic fibers.

The energy absorbing means 44 and 45 extend forward from the approach cable 17 in a diverging direction to anchor means 46 and 47 secured to the landing surface B. Thus the cable 17 is held taut and normally at the lowest horizontal level of the inclined barrier A.

Figure 5:
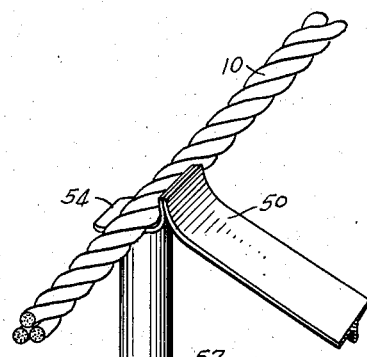
Figure 5 is a detail view partly cut away illustrating the several parts of the ramp members and their respective loose connections with the longitudinal cables strung between the stanchions.

If desired (see Fig. 1), an added means may be provided for maintaining the cables 10, 12, 14, 16 and 17 in proper inclined position. This added means may be in the form of cable ramp bars 50, which comprise a T-shaped bar of light weight material, such as aluminum alloy or the like, having one end resting on the landing surface below the approach-side cable 17 and the other end connected to a vertical supporting tube 52 resting on the landing surface B between the stanchions 38 and 39. Each upper end of the ramp bars 50 is formed with an extension 54, which serves as a rest for the cable 10. Also, projecting from the support tube 52 of each ramp bar is cable rest 56 for the cable 12, see Fig. 5.

To further steady the barrier and hold the stanchions steady in spaced apart alignment, there are provided side tie cables 57 anchored to the landing surface B and the upper side ends of the stanchions.

The embodiment illustrated in Figs. 6, 7, and 8, hereinbefore briefly referred to, illustrates in detail the mountings of the stanchions 38 and 39 in landing surface B. It is particularly desirable when operating from flight towers to have rapid means for erecting the barrier when it is to be used to land an airplane, and also it is equally as desirable to be able to rapidly store the barrier when not in use. Accordingly, the stanchions 38 and 39 may be fluid operated and are mounted in cylinders 60 and 61 sunken in the landing surface B. These cylinders are connected in any well-known manner to a source of fluid supply, not shown, so as to serve as fluid jacks to raise or lower the stanchions and the barrier A with respect to the landing surface B. The cylinders 60 and 61 and their operatively associated stanchions 38 and 39, respectively, are inclined upwardly from the landing surface B toward the front of the barrier A to the marginal cable 10.

Connected to each end of the cable 12 of the barrier in place of the breakable links shown in Fig. 1 are resilient members or springs 63 anchored ahead of the barrier A to the landing surface B so that the springs are under tension when the stanchions are raised, and compressed when they are retracted, see Fig. 8. Thus, as the stanchions retract from their raised position above the landing surface B, the barrier A will always be held taut. As the barrier A swings up or down it follows the arc of a circle, the radius of which is the normal distance, prior to stretching of the energy absorbing means, from the anchors in the landing surface B to the breakable connections between the cable 10 and the stanchions. With the stanchions slanting in this manner they provide for maintaining this radial distance constant and thereby eliminate any slack in the barrier net. Therefore, when the stanchions are completely retracted, the barrier is held taut, flat on the landing surface B for most effective storing of the barrier. The second embodiment of the device has leaders 70 and 71 from each end of approach cable 17 around pulleys 72 and 73, which leaders connect to an energy absorber, not shown, of any suitable type.

*Operation*

The operation of the device is basically the same in both forms, and it is to be understood that the form in Fig. 1 may also be provided with the retractable stanchions. Assuming the stanchions are raised above the landing surface B and the cables 10, 12, 14, 16 and 17 are thus automatically positioned in their five respective horizontal planes, they will provide an inclined step formation of horizontal cables from cable 10 downwardly to the approach cable 17.

The ramp bars 50 may be used with either form of the invention but are optional and the action of the barrier upon engagement by the landing gear of a landing aircraft is the same whether they are used or not.

Thus, when an airplane with a tricycle landing gear approaches the barrier from the approach side having a spread from its nose wheel to its two rear wheels which is approximately equal to the distance between cable 10 and cable 14, it is cable 14 which engages with the rear wheels. In other words, the nose wheel of the landing airplane will first engage with cable 10, and if it pulls on cable 10 the undrawn nylon breaking lengths will begin to be extended toward the limit of their drawn state, and eventually break. As the aircraft continues its forward motion, the nose wheel carries the cable 10 forward with it and there is an uplift pull on the cables 14, 16, and 17 by the stringer strands 20 connected thereto from cable 10. As the cable 14 is in proper position for the rear wheels of this particular landing gear, it will engage the rear wheels of the same and if the airplane goes forward and pulls on the barrier A the energy absorbing means 44 and 45 extend and decelerate the forward motion of the airplane in a gradual manner, until all motion is arrested, as distinguished from abrupt and sudden arrest of motion.

This gradual deceleration is best accomplished by use of the undrawn nylon type energy absorbing members 44 and 45, shown in Fig. 1, although other forms of absorbers can be used.

Other sizes of tricycle landing gear actuate the barrier in the same manner, but the larger size will engage their rear wheels with either the cable 16 or 17.

In landing aircraft with two-wheel landing gear, the cables 10 and 12 between the stanchions 38 and 39 engage the landing gear, whereupon the energy absorber functions in the same manner to gradually decelerate the forward motion of the aircraft.

Without further description, it is believed that those skilled in the art will now be able to understand the operation of the present invention, and while only two embodiments have been illustrated and described, various changes and modifications which will now appear to those skilled in the art, may be made without departing from the scope of the present invention. To determine the scope or limits of the present invention, reference should be had to the appended claims.

What is claimed is:

1. Means for landing airplanes on a restricted landing surface comprising a net-like formation of horizontally positioned cables arranged along an inclined path from a first upper cable above the landing surface to a last lower cable above the surface, support means for holding the said first upper cable taut, frangible connections for coupling the said upper cable to the support means, cross strands connecting said first upper cable, said last lower cable and the intermediate horizontal cables together, each of said horizontal cables being positioned to cooperatively engage with a particular type and size of airplane landing gear, and energy absorbing means operatively connected to each end of the lower portion of the net-like formation and anchored to the landing surface in advance of the airplane approach side of the said formation.

2. An aircraft barrier comprising a body formed of a plurality of longitudinal cables, cross stringers connected to said cables, support means for holding said body elevated above a landing surface away from the aircraft approach side of the same, connecting means for normally securing the body to the support means releasable upon engagement of the body with a landing gear of an airplane, and energy absorbing means anchoring the approach side of the body at a lower level above the landing surface, whereby the said body inclines upwardly from the airplane approach side to form stepped formation of the longitudinal cables adapted to engage with different types and sizes of landing gear.

3. A barrier for effectively engaging different types of airplane landing gear comprising a plurality of normally taut horizontally positioned cables mounted over a landing surface in stepped formation upward from the airplane approach side of the barrier, at least one of said cables being engageable with the landing gear of a landing airplane, and cross stringer members interconnecting said cables together adapted to raise the said cables on the approach side of the barrier upon engagement of the airplane landing gear with a cable at a higher level of the stepped formation away from the approach side of the barrier, said stepped cables being spaced to accommodate different types of landing gear.

4. Means for decelerating the forward motion of an airplane comprising a plurality of horizontally positioned upper and lower cables, support means for holding the uppermost cable elevated above an airplane landing surface, each of said cables being supported at different levels on an incline from said support means, and being spaced so as to be engaged by airplane landing gear of different types and sizes, cross strands connecting the cables together, frangible connections coupling the said uppermost cable to the support means adapted to break upon engagement of the upper cable with different types and sizes of airplane landing gear, and energy absorbing means formed of undrawn nylon anchored to the landing surface and connected to the lower-most cable on the aircraft approach side adapted to arrest the forward motion of an airplane in engagement with one or more of said cables according to the type or size of its landing gear.

5. A barrier for decelerating the forward motion of an airplane comprising a plurality of horizontally positioned cables inclined from an upper to a lower level, a plurality of cross-strands connecting said cables, a pair of spaced stanchions projectable upward above the landing surface, and cylinders substantially the length of said stanchions embedded at an incline in the landing surface adapted to be connected to a source of fluid to extend and retract the stanchions, to thereby raise or lower the barrier with respect to the landing surface, said stanchions slanting from the cylinders to connect with an end cable of the barrier when in extended position and adapted when retracted into the cylinders to compensate for slack in the cross strands of the barrier and evenly spread the same over the landing surface when not in use.

6. In an aircraft barrier adapted to decelerate the forward motion of an aircraft, a support means comprising a pair of spaced stanchions, means mounted in an aircraft landing surface adapted to raise and lower said stanchions with respect to the landing surface, a net-like body connected to the top ends of each of said stanchions, anchor means for securing the approach side of said body to the landing surface and second anchor means yieldably connecting the opposite end of said body to the landing surface whereby upon retraction of the stanchions within said means the said body is pulled downward into engagement with the landing surface in a flat taut condition.

ROBERT B. COTTON.

REFERENCES CITED

The following references are of record in the file of this patent:

UNITED STATES PATENTS

| Number | Name | Date |
|---|---|---|
| 1,259,060 | West | Mar. 12, 1918 |
| 1,306,860 | Smith | June 17, 1919 |
| 1,428,163 | Harriss | Sept. 5, 1922 |
| 2,237,106 | Minert | Apr. 1, 1941 |
| 2,324,726 | Sawyer | July 20, 1943 |